Dec. 17, 1957  H. D. SMITH  2,817,071
FAILURE WARNING DEVICE FOR SERVO SYSTEMS
Filed July 5, 1955

INVENTOR
HARRY D. SMITH
BY
ATTORNEY

United States Patent Office 2,817,071
Patented Dec. 17, 1957

2,817,071

FAILURE WARNING DEVICE FOR SERVO SYSTEMS

Harry D. Smith, Massapequa, N. Y., assignor to Sperry Rand Corporation, a corporation of Delaware Application July 5, 1955, Serial No. 519,940

23 Claims. (Cl. 340—149)

The present invention relates to servo systems for remotely controlling and accurately positioning objects; and means for determining failures or errors within the servo system.

More particularly, the present invention relates to means for indicating discrepancies in a servo system for positioning or controlling a driven object through a multiplicity of components where the control signal ordinarily derived from and as a measure of relative displacement between the driven object and a reference member may have errors included therein because of component failures or changes in component characteristics thereby rendering the performance characteristics of the system relatively poor.

Still more particularly, the present invention relates to systems wherein a driven object is controlled according to a control signal voltage by the setting or positioning of a reference member. Such systems of the position-control type ordinarily include a means for supplying what may be termed primary control signals corresponding to the relative displacement between the reference and the driven object.

It is the principal object of the present invention to provide in a servo system of the foregoing type improved means for providing an indication of the deviations from normal operation.

A further object is to provide means whereby the primary control signal and a feedback signal are combined to produce a signal of a constant characteristic such that deviations from this constant signal then indicate malfunctions within the over-all system.

A further object of the present invention is to provide a means for readily determining whether the components in the system are operating within their normal range.

A still further object resides in providing a deviation indicator which may be interpreted to give an indication of the character of the system or component failure.

A still further object of this invention is to provide an indication of the relative discrepancy between the normal or allowable operating range and the actual operating range of the servo system in question, due to a component or a system failure or changes in the steady state transfer functions whereby errors may be determined, claissified, and evaluated.

Other objects and advantages of the present invention not at this time particularly enumerated will become apparent from the following description of a preferred embodiment thereof when considered in the light of the annexed drawings wherein:

Fig. 1 illustrates a servo system embodying means for indicating the operating characteristics thereof in accordance with the present invention utilizing a torque motor.

Fig. 2 illustrates a position indicating servo system utilizing a resilient member in conjunction with a deviation indicator.

Fig. 3 is a sectional view showing a mounting arrangement of the resilient member.

It will be understood that within the broad scope of the present invention the deviation indicating means herein illustrated and described may take many forms and may be used for indicating the deviation from a normal range in many types of servo systems, only two of which are described, primarily for illustrative and exemplary purposes.

The present invention is disclosed in Fig. 1 applied to a position control servo system. A means for supplying a control signal to the servo system is illustrated as a control signal generator 1 having a potentiometer 2 and a power source 3. Primary control signals are introduced into the system in accordance with the positioning of the slider arm 4 by reference knob 5. A modulator amplifier 6 acts as a servomotor control means responsive to the control signal and is connected to the signal generator 1 through lead 7 receiving primary control signals therefrom. A suitable power source 8 is also connected to amplifier 6. A servomotor 9 is connected to and controlled by the signal received from the amplifier 6. Servomotor 9 is also connected to a suitable power source 10. The output shaft 11 of servomotor 9 is rotated in a direction and at a velocity corresponding to the potential of the control signal. The output of shaft 11 is coupled to drive a first input shaft of a power transmission means indicated as a gear train 12.

A means for continuously supplying a constant moment in the form of a torque motor 13, having a suitable power source 14, is connected by shaft 15, to drive a second input shaft to gear train 12. The unidirectional moment applied by the torque motor 13 as shown in the embodiment of Fig. 1 is maintained during the operation of the servo system at a constant amount, and in a direction such as to oppose rotation of servomotor output shaft 11, in the steady state condition. The torque applied by torque motor 13 is generally a fraction of the maximum servomotor output torque, and in normal operation it will be readily overcome by the servomotor output torque.

Thus, the outputs of the servomotor 9 and the torque motor 13, are applied to drive the first and second inputs to gear train 12 and the combined outputs are effective to position a load member 16 that is connected through a shaft 17 to an output of gear train 12. The load member 16, therefore, is positionable in accordance with the direction and amount of rotation of the output shaft 11 of servomotor 9, operating through gear train 12 as modified by the torque supplied by torque motor 13, also operating through gear train 12.

Thus, there is proportionately less energy available in the servo system to position the load 16 in the steady state condition since the torque motor 13 applies a constant or known moment which the servomotor 9 must continuously overcome. A constant error is thereby introduced into the servo system corresponding to the constant torque applied by the torque motor 13 in opposition to the torque applied by the servomotor 9 that is endeavoring to position the load 16. Since the error introduced into the system by the torque motor 13 has a constant or known magnitude, the position of the load member 16 may be calibrated to compensate for the constant or known error or secondary unbalance load applied by torque motor 13.

The wiper arm 18 of a feedback potentiometer, generally indicated at 19, is actuated by a second output shaft 20 of gear train 12 such that the position of wiper arm 18 is a function of the position of the load member 16. However, the wiper arm position is not compensated for the constant error introduced by the torque motor. A signal is thereby generated in lead 21 which is a function of the uncompensated position of load member 16. The said signal, usually termed a feedback signal, is introduced degeneratively into amplifier 6 through said lead 21, thereby providing means positioned in accordance with the load member 16 feeding back a signal to the control means. The input to amplifier 6 is then the primary control signal and the feedback signal which has been introduced degeneratively in relation to the primary control signal. The output of amplifier 6 that is fed into servomotor 9 is then the difference between the primary control signal and the feedback signal.

Since the feedback potentiometer 19 is not compensated for the constant error introduced by torque motor 13, it will therefore introduce through lead 21 a feedback signal which is a function of the combination of the primary control signal as evidenced by the servomotor output minus the torque applied to the servomotor output shaft 11 by torque motor 13. The feedback signal is then applied to the amplifier 6 through lead 21 degeneratively. The feedback signal therefore is always of lesser magnitude than the primary control signal under normal system operation and when it is compared in the amplifier 6 with the primary control signal there remains a constant error voltage throughout the system in the steady-state condition. Thus, in lieu of having a servo system in which the voltage throughout the system approaches zero when the load member is positioned in accordance with the signal from the reference member, a system has been described whereby a constant error voltage is maintained throughout the system. The load, however, has been positioned in accordance with the primary control signal from the reference member, due to the initial offset calibration of the load member.

The operation of a servo system incorporating this invention may also be explained as the addition of a means to a conventional servo system for continuously applying a substantially constant torque to the output shaft 11 of a servomotor 9, such as to generate a position error signal by displacing the feedback potentiometer wiper arm 18. The error signal after being amplified in amplifier 6 is applied to the servomotor 9. The servomotor 9 will provide a torque proportional to the error signal which in turn will oppose the unbalance torque initially applied by torque motor 13. This will result in a steady state equilibrium position whereby the position of the load member 16 is displaced by a known amount from the original equilibrium position. This constant error which has been introduced is taken into account in the calibration of the load position. The constant error introduced will depend on the uniformity of the unbalance torque applied. If the unbalance torque changes by a certain percentage, then the known calibration displacement or original deviation from equilibrium will be in error by the same percentage.

The constant error signal throughout the system is used as a means of monitoring the system by measuring the deviations therefrom. A deviation indicating device responsive to the operation of said servo system indicating departure from a desired operating range of the constant error signal whereby the difference between the control signal and the feedback signal is continuously monitored is a method of accomplishing this result.

As illustrated in Fig. 1, the deviation indicating device, generally shown at 22, may take the form of a signal measuring instrument connected between the amplifier output and the servomotor input to measure the error signal. The instrument shown is a voltmeter utilizing a D'Arsonval meter movement 23 connected to a phase sensitive rectifier circuit 24 and filter network 25 and thence by leads 26 and 27 to the electrical connection between the amplifier output and the servomotor input. Pointer 28 is attached to meter movement 23 and is actuated thereby in accordance with the polarity and amplitude of the error signal. Indicator dial scale 29 is divided into three sections and is calibrated to cooperate with pointer 28. The normal operating range of the servo system as indicated by pointer 28 occupies the center portion of the scale 29 and is indicated as a green area. Two sections of the scale which are indicated in red occupy adjacent areas to the right and to the left of the center green portion and indicate excessive deviations from normal when pointer 28 is located within said sections. The deviation indicating device 22 is calibrated such that during proper operation of the servo system, in the steady state condition, pointer 28 is vertically positioned indicating a constant mid-scale deflection. Thus, with the deviation indicator device 22 so calibrated and marked off in green and red for the normal operating range and for values above and below the normal operating range respectively, the movements of pointer 28 can be readily interpreted to determine the type and characteristics of system or component failure.

Fig. 2 applies the invention to a position indicating servo system. The system described in Fig. 2 is similar in many respects to Fig. 1 and many components thereof may be used interchangeably. A means for supplying a control signal to the servo system of Fig. 2 is illustrated as a temperature reference element 30 which initiates a temperature signal that is variable by manipulation of a power lever 31. The temperature reference element 30 might be similar, for example, to the control signal generator illustrated in Fig. 1. The amplitude of the output voltage of element 30 may be controlled through a potentiometer actuated by the power lever or other suitable means. The D. C. voltage output of the temperature reference element 30 is supplied as one input to a suitable electrical summation device illustrated in the present embodiment of the invention as summing circuit 32 having conventional isolation means not shown. The temperature signal is partially cancelled out at the electrical differential 32 by means of a second input to the summation device 32 which is a voltage obtained from the feedback potentiometer 33. The feedback potentiometer 33 might be similar, for example, to the feedback potentiometer 19 shown in Fig. 1. The differential output signal from the summing circuit 32, which is the difference between the feedback potentiometer voltage and the temperature input voltage is applied to an electromechanical magnetic modulator 34 wherein the D. C. differential voltage is converted to a 400 cycle alternating voltage. The modulated 400 cycle signal is amplified in amplifier 35 and applied to the control field of a 400 cycle servomotor 36 which drives a gear train 37. Two limit stops 44 and 45 are contiguous to the servomotor output shaft; one limiting clockwise rotation of the gear train shaft, and the other limiting counterclockwise rotation of the gear train shaft. Mechanically coupled to an output shaft 38 of the gear train 37, is a mechanical temperature indicating pointer 39 equivalent to a load member which travels over a calibrated scale 40 indicating the temperature introduced by the temperature reference 30.

A mechanical restraint in the from of a resilient member shown as a failure reference spring 41 is flexibly coupled to a shaft of gear train 37. The resilient member 41 continuously supplies a substantially constant moment opposing and less than the maximum moment of the servomotor 36 in the steady state condition. This is done in order that in the steady state condition of the servo system, an error signal output will always be maintained at a small fixed voltage which can be monitored. The small error signal is achieved by the servomotor 36 endeavoring simultaneously to overcome the constant opposing torque of the failure reference spring 41 and to position the temperature indicating pointer 39. Since the slider 42 of the feedback potentiometer 33 is mechanically coupled to the output shaft of the gear train 37 that actuates the pointer 39, the feedback signal applied to the electrical differential 32 is less than the temperature reference input voltage by an amount corresponding to the constant torque applied by the resilient member 41 in the steady state condition. The servo loop comprising the electrical differential, modulator, amplifier, servomotor, gear train and feedback potentiometer stabilizes in an operating condition wherein a small fixed error voltage output is produced in the electrical differential. Since the error signal through the system remains constant under normal conditions, the calibrated scale 40 can be calibrated to compensate for the constant error and thus render accurate readings.

In order to maintain a substantially constant force output from the resilient member 41 shown in Fig. 3, mechanical stops 44 and 45 on the servomotor output shaft limit the amount of deflection of the spring as indicated by the dotted lines. Using this technique, the output force of a conventional helical spring can be held within a narrow range to provide a substantially constant moment about the gear train shaft 46 through connecting arm 47. If additional accuracy is required, constant force springs which are designed to maintain a constant force with increasing deflection may be utilized in lieu of the more conventional helical, spiral or flat springs.

The invention disclosed herein is adaptable for indicating the following representative system failures as well as many others. A complete amplifier failure reduces the error signal to zero thereby positioning pointer 28 to the left red zone of scale 29. An amplifier failure in which a hard-over signal is produced will deflect the pointer to the maximum reading, either right or left in the red zone. Any amplifier failure, abnormality or malfunction in which there is an appreciable gain change that causes the system to position incorrectly, will produce either a low red reading or a high red reading. A servomotor failure in which the fixed field or the control field is open, will produce an indication in the plus red section since the constant torque motor will drive the servomotor providing a large error signal. If the feedback potentiometer loses its excitation or is open at the wiper, a right red reading will be indicated since the feed-back signal has gone to zero. If the control signal potentiometer loses excitation or opens at the wiper, there will be hardover maximum signal indicating in the right red region. In the event that the load should be obstructed or stick, there will be an indication either right red or left red depending upon which way the load is being turned at the time. After each of the failures have been corrected, the error signal returns to its former value and the indication on the deviation indicator scale will then be in the green region as it had been prior to the failure.

It should be noted that the invention described heretofore can be applied to various types of electric, pneumatic, hydraulic, or mechanical servo systems, including unidirectional or bidirectional servo systems. If desired, the amount of rotation can be limited by the use of stops on the shaft of the servomotor or load. In certain systems, protection of the meter movement to prevent overload would be advisable. Should it be desired to have a completely unrestrained bidirectional system incorporating this invention, it could be accomplished by the use of a selsyn-type feedback transmitter and a phase-sensitive demodulator or polarity sensitive relay switching circuits. It should be understood that the invention applies to servo systems which operate with A.-C. or D.-C. signal sources, motors or amplifiers and the systems may be made as simple or as complex as desired by the elimination or addition of conventional components. Depending upon the type of systems and control signal strength, it may or may not be necessary to employ an amplifier, a rectifier or a filter network. In other applications, it would not be necessary to employ a gear train since all the components coupled to the gear train could be directly connected to or actuated by the servomotor output shaft.

Although I have shown and described the use of a torque motor and a helical spring to provide a substantially constant torque opposing the output torque of the servomotor in the steady state condition, it should be recognized that any force or torque-applying device which will provide a substantially constant or known force or moment opposing the movement or rotation of the output shaft of the servomotor in the steady state condition or coupled to a gear train or other power transmission means and opposing the output shaft rotation of the servomotor would be acceptable. Mechanisms of this type would include, but are not necessarily limited to constant force springs, also conventional helical, spiral and flat type springs. A weight coupled to the circumference of the shaft extending from the gear train or the output shaft of the servomotor such as to oppose the rotation of the output shaft of the servomotor under steady state conditions would be satisfactory for certain applications. The use of an additional field winding in the servomotor supplying a constant opposing torque to the torque supplied by the primary field winding would also be within the scope of the invention. Modifications within the scope of the invention also include the utilization of a force or moment that is variable in a known manner by calibrating the necessary components of the system to compensate for the variable but known error.

If the torque applied to the output shaft of the servomotor is truly constant with angular position and if all the gains within the servo system remain constant, the angular displacement of the ouput shaft from the true null will remain constant. The result will be that in the steady state a constant error voltage will be applied to the motor due to the difference in magnitude of the control signal input and the feedback signal. Malfunctions can then be detected by changes in the magnitude of this error voltage and indicated by the deviation indicating device. The malfunctions will produce one of two effects, namely, reduction of the error voltage or increase of the error voltage, each of which characterizes a type of system or component failure.

A failure warning device of the type described is particularly advantageous when the system failure constitutes the failure or change in the steady state transfer functions of the amplifier, servomotor, power supply or other component which would reduce the system voltage to zero. This type of failure is very difficult to detect in the conventional servo systems since in the normal steady state operation, the voltage throughout the system will be zero or very close to it. Using this invention, however, in the servo system, there is a constant error signal which can be monitored. Since this signal has a finite magnitude, the deviations plus or minus from the finite amount can be determined and indicated on the scale which will readily indicate a failure and the characteristics thereof. Any appreciable change causing inaccurate positioning in the gain characteristics of the amplifier or other component can be readily discerned through the use of the deviation indicating device as the pointer will move from the green position to the red, either to the right or left of the norm.

Large transient disturbances under certain conditions may drive the indicator attached to the meter movement above or below the normal operating conditions, even though the device or system is functioning properly. However, unless the transient signal drives the servo system out of the linear region, the indications will begin to return to normal immediately. By providing sufficient damping, electrically or mechanically, it is possible to limit the excursion of the indicator during transients and maintain a nearly constant indication as the input is slowly changed.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A servo system comprising means supplying a control signal, a servomotor, servomotor control means responsive to said control signal, means continuously supplying a constant moment less than the maximum moment of said servomotor, a member positionable by the combined outputs of said servomotor and said constant moment means, means positioned in accordance with said member feeding back a signal to said control means, and a deviation indicating device responsive to the operation of said system indicating departure from a desired operating range whereby the difference between the control signal and the feedback signal is monitored.

2. A failure warning device for a servo system comprising a control signal generator, a servomotor, means continuously supplying a unidirectional constant moment less than the maximum moment of said servomotor, servomotor control means responsive to said control signal, a member positionable by the combined outputs of said servomotor and said constant moment means, means positioned in accordance with said member feeding back a signal to said control means, and a deviation indicating device responsive to the operation of said system, whereby the indicator of the deviation indicating device is centrally located for normal operation and deviates therefrom when indicating errors within the system.

3. A servo system comprising a servomotor having a source of power therefor and an output, means providing a control signal proportional to a desired servomotor output, a servomotor control means responsive to said control signal, a resilient member flexibly coupled to said servomotor output continuously supplying a substantially constant moment less than the maximum moment of said servomotor, a member positionable by the combined outputs of said servomotor and said resilient member, a signal feedback means positioned in accordance with said member feeding back a signal to said control means, and a failure warning device indicating deviation to either side of a desired normal operating zone.

4. A servo system comprising a control signal generator supplying a control signal, a servomotor, an amplifier responsive to said control signal connected in controlling relation to said servomotor, means continuously supplying a constant moment less than the maximum moment of said servomotor, a member positionable by the combined outputs of said servomotor and said constant moment means, means positioned in accordance with said member feeding back a signal to said amplifier, and a voltmeter connected between said amplifier and said servomotor responsive to the operation of said system indicating departure from a desired operating range whereby the difference between the control signal and the feedback signal is continuously monitored.

5. A failure warning device for a servo system comprising a control signal generator, a positioning member, positioning member control means responsive to said control signal generator, means continuously supplying a constant force less than the maximum force of said positioning member, a member positionable by the combined outputs of said positioning member and said constant force means, means positioned in accordance with said member feeding back a signal to said control means, and a deviation indicating device responsive to the operation of said system indicating departure from a desired operating range.

6. A servo system comprising means supplying a control signal, a servomotor, servomotor control means responsive to said control signal, means supplying a known moment less than the maximum moment of said servomotor, a member positionable by the combined outputs of said servomotor and said known moment means, means positioned in accordance with said member feeding back a signal to said control means, and a deviation indicating device responsive to the operation of said system indicating departure from a desired operating range.

7. A servo system comprising a first motive means having an output, a first signal generating means for supplying a control signal to the first motive means, a second motive means having a determinable output opposing the output of the first motive means, a second signal generating means supplying a feedback signal to the first motive means in accordance with the combined outputs of the first and second motive means, and a deviation indicating device responsive to the operation of the system indicating departure from the normal operating range.

8. A servo system of the character recited in claim 7 in which the deviation indicating device includes a signal smoothing means whereby the signal deviations are integrated.

9. A servo system of the character recited in claim 7 in which the deviation indicated device includes D'Arsonval type movement.

10. A servo system of the character recited in claim 7 in which the deviation indicating device includes a filter circuit and a voltmeter.

11. A transmission system comprising a control means supplying a control signal, means including an amplifier responsive to said control signal, a motive means having an output in accordance with the signal from said amplifier means, a primary load member positionable by the output of said motive means, a secondary load member positionable by the output of said motive means adapted to provide a constant load less than and opposing the output of the motive means, a feedback means positionable in accordance with the combined positions of the primary and secondary load members feeding back a signal to said control means, and a deviation indicating device responsive to the operation of said system indicating departure from a desired operating range.

12. A failure warning device for a servo system comprising a control signal generator for supplying a control signal, an amplifier responsive to the control signal, a servomotor having an output shaft positioned in accordance with the amplifier output, power transmission means positionally coupled to the servomotor output shaft, means continuously applying a substantially constant output to the power transmission means oppositng the output of the servomotor, a feedback means supplying a signal to the amplifier in accordance with the combined outputs of the servomotor and the means continuously applying a substantially constant output, and a failure warning indicator responsive to the operation of the system.

13. A failure warning device for a servo system of the character recited in claim 12 in which the deviation indicating device includes a signal smoothing means whereby the system signals are integrated.

14. A failure warning device for a servo system of the character recited in claim 12 in which the deviation indicating device includes a meter movement.

15. A failure warning device for a servo system of the character recited in claim 14 in which the deviation indicating device includes a filter circuit.

16. A failure warning device for a servo system comprising a control signal generator for supplying a control signal, an amplifier responsive to the control signal, a servomotor having an output shaft positioned in accordance with the amplifier output, power transmission means including a gear train positionably coupled to the servomotor shaft, a torque motor continuously applying a substantially constant torque to the gear train opposing the output of the servomotor, a feedback means supplying a signal to the amplifier in accordance with the combined outputs of the servomotor and the torque motor, and a failure warning indicator responsive to the operation of the system.

17. A control system comprising a control signal generator for supplying a control signal, an amplifier responsive to the control signals, a servomotor having an output shaft positioned in accordance with the amplifier output, power transmission means positionably coupled to the servomotor output shaft, a torque motor continuously applying a substantially constant torque to the power transmission means opposing the output of the servomotor, a load member positionable by the combined outputs of the servomotor and the torque motor through the power transmission means, a feedback means supplying a signal to the amplifier in accordance with the position of the load member, and a failure warning indicator responsive to the operation of the system.

18. A control system of the character recited in claim 17 in which the deviation indication device includes a meter movement.

19. A control system of the character recited in claim 17 in which the deviation indicating device includes a signal smoothing means.

20. A control system of the character described in claim 19 in which the deviation indicating device includes a meter movement responsive to the output from the signal smoothing means.

21. A monitoring device for a servo system comprising signal generating means including a potentiometer for supplying control signals, an amplifier responsive to the control system, a servomotor having an output shaft positioned in accordance with the amplifier output, power transmission means positionably coupled to the servomotor output shaft, a torque motor for applying a constant torque to the power transmission means opposing the output of the servomotor, a load member positionable by the combined outputs of the servomotor and the torque motor through the power transmission means, a feedback means including a potentiometer positioned by the power transmission means supplying a feedback signal degeneratively to the amplifier corresponding to the position of the load member, and a monitoring device coupled between the amplifier and the servomotor responsive to the operation of the system.

22. A monitoring device for a servo system of the character described in claim 21, in which the signal generating means includes a synchro transmitter in lieu of a potentiometer and the feedback means includes a synchro pick-off in lieu of a potentiometer.

23. A monitoring device for a servo system of the character described in claim 22 in which the monitoring device includes a rectifier circuit having an output responsive to the operation of the system, a filter circuit coupled to the output of the rectifier, and a meter movement coupled to the output of the filter responsive to the operation of the system whereby system fluctuations are smoothed and monitored.

References Cited in the file of this patent

UNITED STATES PATENTS

| | | |
|---|---|---|
| 2,405,568 | Ferrill | Aug. 13, 1946 |
| 2,410,669 | Lynn | Nov. 5, 1946 |
| 2,596,199 | Bennett | Jan. 25, 1955 |
| 2,700,755 | Burkhart | Jan. 25, 1955 |
| 2,702,380 | Brustman, et al. | Feb. 15, 1955 |
| 2,747,162 | Attura | May 22, 1956 |